United States Patent
Mitchell et al.

(10) Patent No.: US 6,990,109 B2
(45) Date of Patent: Jan. 24, 2006

(54) METHOD AND APPARATUS FOR PROVIDING RELIABLE VOICE AND VOICE-BAND DATA TRANSMISSION OVER ASYNCHRONOUS TRANSFER MODE (ATM) NETWORK

(75) Inventors: Bruce Edward Mitchell, Madison, AL (US); Ayman K. Ghobrial, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 809 days.

(21) Appl. No.: 09/999,463

(22) Filed: Oct. 31, 2001

(65) Prior Publication Data

US 2003/0081550 A1 May 1, 2003

(51) Int. Cl.
*H04L 12/28* (2006.01)
*H04L 7/00* (2006.01)
*H04J 3/06* (2006.01)

(52) U.S. Cl. ................. 370/395.62; 370/516; 375/326; 375/371; 375/376

(58) Field of Classification Search .............................. 370/395.62–395.65, 506–520; 375/376, 375/327, 326, 371
See application file for complete search history.

(56) References Cited

U.S. PATENT DOCUMENTS

| | | | | |
|---|---|---|---|---|
| 4,706,263 A | * | 11/1987 | von der Embse | 375/343 |
| 5,361,261 A | | 11/1994 | Edem et al. | 370/85.3 |
| 5,450,447 A | * | 9/1995 | Dutta | 375/344 |
| 5,784,379 A | * | 7/1998 | Tan | 370/503 |
| 5,844,891 A | | 12/1998 | Cox | 370/235 |
| 5,966,387 A | | 10/1999 | Cloutier | 370/516 |
| 6,111,878 A | | 8/2000 | Powell | 370/395 |
| 6,188,692 B1 | | 2/2001 | Huscroft et al. | 370/395 |
| 6,252,850 B1 | | 6/2001 | Lauret | 370/235 |
| 6,819,727 B1 | * | 11/2004 | Cucchi et al. | 375/372 |
| 6,876,674 B1 | * | 4/2005 | Ruutu et al. | 370/503 |

* cited by examiner

*Primary Examiner*—Steven H D Nguyen
(74) *Attorney, Agent, or Firm*—Allen, Dyer, Doppelt, Milbrath & Gilchrist, P.A.

(57) ABSTRACT

Adaptive clock recovery for the receiving entity of a communication system transporting constant bit-rate (CBR) services over an asynchronous transfer mode (ATM) or ATM-like network is performed by a digital phase locked loop (DPLL). The recovered clock is based on the DPLL's phase detector's count of high frequency service clock cycles between transitions in an input signal representative of instances of receipt of ATM cells subject to cell delay variations through the network, and a reference clock signal whose frequency is a prescribed fraction of that of the output clock. The DPLL's VCO function is an increment/decrement of the service clock frequency, which avoids constraining the operation of a high performance modem (such as a V.90 modem).

24 Claims, 4 Drawing Sheets

PLL OPERATIONS MODES

| MODE | α | β | FREQ. ACCUM. | PHASE ACCUM. |
|---|---|---|---|---|
| ACQUIRE | HIGH GAIN | HIGH GAIN | RUN | RUN |
| TRACK | LOW GAIN | LOW GAIN | RUN | RUN |
| FREEZE | 0 | 0 | FREEZE | RUN |
| FREE-RUN | 0 | 0 | CLEARED | CLEARED |

STEPPING DOWN α, β

|  | α | β |
|---|---|---|
| ACQUIRE | $2^0$ | $2^{-8}$ |
| STEP 1 | $2^{-1}$ | $2^{-10}$ |
| STEP 2 | $2^{-2}$ | $2^{-12}$ |
| STEP 3 | $2^{-3}$ | $2^{-14}$ |
| TRACK | $2^{-4}$ | $2^{-16}$ |

METHOD AND APPARATUS FOR PROVIDING RELIABLE VOICE AND VOICE-BAND DATA TRANSMISSION OVER ASYNCHRONOUS TRANSFER MODE (ATM) NETWORK

FIELD OF THE INVENTION

The present invention relates in general to asynchronous communication systems and subsystems therefor, and is particularly directed to a new and improved digital phase locked loop (DPLL)-based adaptive clock recovery mechanism employed by the receiving entity of constant bit-rate (CBR) telecommunication signals transmitted over an asynchronous transfer mode (ATM) or ATM-like network, to achieve reliable voice and voice-band data communications in a manner that is effectively transparent to an associated modem serving customer premises equipment. The invention generates an output (recovered) clock based upon the DPLL's phase detector's count of the number of high frequency service clock cycles that occur between transitions in an input signal representative of instances of receipt of ATM cells written into a cell jitter buffer and subject to cell delay variations through the network, and a reference clock signal whose frequency is a prescribed fraction of that of the output clock.

BACKGROUND OF THE INVENTION

The ability to conduct high-speed data and voice communications between remotely separated data processing systems and associated subsystems has become a requirement of a variety of industries and applications, such as business, educational, medical, financial and personal computer uses. Moreover, it can be expected that future applications of such communications will engender more systems and services in this technology. Associated with such applications has been the growing use and popularity of the "Internet", which continues to stimulate research and development of advanced data communications systems between remotely located computers, especially communications capable of achieving relatively high-speed data rates over an existing signal transport infrastructure (e.g., legacy copper cable plant).

One technology that has gained particular interest in the telecommunication community is digital subscriber line (DSL) service, which enables a public service telephone network (PSTN) to deliver relatively high bandwidth signals (including voice and data) using conventional telephone company copper wiring infrastructure. DSL service has been categorized into several different technologies, based upon expected data transmission rate, the type and length of data transport medium, and encoding/decoding schemes.

Regardless of its application, the general architecture of a DSL network essentially corresponds to that diagrammatically shown in FIG. 1 as comprising a pair of remotely separated, mutually compatible digital communication transceiver entities. One entity is located at respective network controller site 10 (such as a telephone company central office (CO)), while a second entity is located at a customer premises site 20. Each transceiver is coupled to a communication link, such as a twisted pair (loop) 30 of an existing copper plant. Using ATM-based, digital subscriber line (DSL) protocol, this telecommunication fabric allows information, such as voice and (Internet-sourced) data (which is readily accessible via a backbone network 15), to be transmitted from the central office site 10 over the DSL loop 30 to an integrated access device (LAD) 21 at the customer site 20.

For this purpose, at the network controller site 10, a DSL transceiver 11 is customarily located in a DSL access multiplexer (DSLAM) 12. Within the communication infrastructure of the telephone company, DSLAM 12 is coupled with the backbone 15, which typically contains one or more of signaling transport devices, such as an asynchronous transfer mode (ATM) switch 31, a voice gateway 33, a Class-5 switch 35, and the like, that are linked to an internet service provider (ISP) 37. Also a data gateway 36 may link the ATM switch 31 to a data network 38.

The other transceiver, serving the customer premises site 20, may comprise an integrated access device (IAD) 21, which is coupled via a plain old telephone system (POTS) interface 23 to a modem 25 (such as a V.90 modem) serving data terminal equipment (DTE) 27.

For transporting data and voice, an ATM network of the type shown in FIG. 1 employs ATM Adaptation Layer 5 (AAL5) for data transport, and AAL2 for voice transport. As ATM is a 'cell'-based asynchronous transfer protocol, processing at both is the transmit or source site and the receiver entity are necessary to ensure a continuous CBR flow of voice and voice-band data cells across the ATM fabric. Unfortunately, AAL2 protocol-based voice and voice-band data transmission can be disrupted by delays encountered by the ATM cells during their transport over the network. These delays are of two types: 1—fixed delay associated with the configuration of the network (which is predictable and readily accounted for), and 2—variable delay (termed Cell Delay Variations (CDV)) associated with the traffic load on the network switches, causing successive ATM cells to arrive at a receiving or destination entity in an aperiodic manner.

To minimize or eliminate these disruptions, in order to effectively ensure reliable voice-band data transmission, it is necessary to remove the variable delay component of cell arrival time. This is customarily achieved through the use of a cell jitter buffer of sufficient length to accommodate maximum cell delay variation), and synchronizing the receive site's POTS interface (the IAD's CODEC) clock to the far-end or source site's transmitter clock, in a manner that avoids overflow or underflow of the buffer (which will occur if the clocks are not locked together).

One relatively straightforward method to recover the clock is to encode the transported ATM stream with a Synchronous Residual Time Stamp (SRTS) representative of the frequency difference between the source clock and a common reference network clock. At the receiving entity, the SRTS is decoded to regenerate the source clock frequency. Unfortunately, for AAL2-based data transmissions, physical layer timing on the DSL loop may not always be traceable to a primary reference source (transmit site) clock, and must be extracted 'adaptively' from the incoming AAL2 cell stream.

In an adaptive clock recovery scheme, no explicit timing information is transmitted from source to destination across the network and no common reference clock is used. Instead, source clock frequency information is derived by monitoring ATM cell arrival activity, and averaging out CDV effects. While there is currently no 'standardized' method, adaptive clock recovery has typically involved monitoring the 'fill' level of a cell jitter buffer, through which received ATM cells are controllably clocked by an associated clock recovery loop, and adjusting the receive entity clock, so that positions of write/read pointers to the buffer fall within a prescribed error window relative to a selected (e.g. median or statistically averaged) buffer fill level, and avoid overflow or underflow of the buffer.

For an illustration of non-limiting examples of literature describing various clock recovery schemes including both SRTS and buffer fill level-based adaptive mechanisms of the type described above, attention may be directed to the following U.S. Pat. Nos. 5,361,261, 5,844,891, 5,966,387, 6,111,878, 6,188,692 and 6,252,850.

SUMMARY OF THE INVENTION

In accordance with the present invention, adaptive clock recovery at the receiving entity is accomplished by means of a digital phase locked loop (DPLL), that is operative to generate an output (recovered) clock, based upon the DPLL's phase detector's count of the number of high frequency service clock cycles that occur between transitions in an input signal representative of instances of receipt of ATM cells written into the cell jitter buffer (and subject to cell delay variations through the network), and a reference clock signal whose frequency is a prescribed fraction of that of the output clock.

For this purpose, a cell jitter buffer and a second order DPLL, through which write and read pointers for the buffer are produced by associated control logic, have respective inputs coupled to receive signals associated with ATM (AAL2) cells as captured by the receiver's communications control processor from the xDSL link. The cell jitter buffer may be configured as a length L, first-in, first-out (FIFO) buffer, where L is greater than or equal to the maximum expected CDV. The cell jitter buffer stores the actual ATM cells, while the DPLL is coupled to receive a cell arrival interrupt signal $\Phi_{in}$ generated by the control processor as a respective cell is captured from the link. The DPLL also receives a high frequency (e.g., 40.96 MHz) service clock signal $f_s$, which is used to set the phase adjustment step of the DPLL.

The DPLL's phase detector is coupled to receive the cell arrival interrupt signal $\Phi_{in}$ and a recovered output clock signal $\Phi_{out}$ derived from a controlled clock generator, which serves as the DPLL's voltage controlled oscillator function. The output of the phase detector is coupled to a (second order) loop filter which drives the clock generator. In accordance with the invention, the phase detector is implemented as an edge detector, by counting the number of clock cycles of the service frequency $f_s$ that occur between prescribed (e.g. rising edge) transitions of the input signal $\Phi_{in}$ and the DPLL's output clock signal $\Phi_{out}$. The phase detector outputs a count-representative phase error signal $P_e$ to the loop filter.

The second order loop filter includes first and second gain stages. The loop filter is coupled to a phase accumulator within the (VCO) clock generator. The clock generator is configured as an increment/decrement unit, that is coupled to the output of a service frequency clock generator and contains a divide-by-two output coupled to a divide-by-$N_1$ frequency divider, where $N_1$=10. As a result, for a reference service frequency $f_s$=40.96 MHz, the output of the divide-by-$N_1$ frequency divider produces a CODEC clock frequency of 2.048 MHz.

The output of divide-by-$N_1$ frequency divider is further coupled to a divide-by-$N_2$ (e.g., 22528) frequency divider and to a divide-by-$N_3$ (e.g., 256) frequency divider. For these non-limiting parameters, the output of the divide-by-$N_2$, which corresponds to the DPLL output clock signal $\Phi_{out}$, with a nominal frequency of 90.909 Hz. The output of the divide-by-$N_3$ frequency divider is 2048/256 KHz=8 KHz, which is the frequency of the byte read clock.

With both the phase detector and the loop filter running at 90.9090 Hz, a reasonably fast acquisition speed may be realized by running the VCO's phase accumulator and the clock generator at 128 KHz, as a non-limiting example. The period or time step $T_1$ for the loop filter integrator is therefore $T_1$=1/90.9090 seconds, while the time step $T_2$ for the (VCO) clock generator's integrator is $T_2$=1/128000 seconds.

In general, second order loop filter function F(S) may be expressed as: $F(S)=\alpha+\beta/S$, while the system transfer function H(S) for $\Phi_{out}/\Phi_{in}$ may be expressed as:

$$H(S) = \Phi_{out}/\Phi_{in} = \{(K/S)*F(s)\}/\{1+(K/S)*F(s)\}$$

$$= \{(K*\alpha*S)+(K*\beta)\}/\{(S^2+K*\alpha*S)+(K*\beta)\},$$

where K is VCO gain, and $\alpha$ and $\beta$ are filter constants.

Equating the expression for H(S) with the standard expression for a second order control system yields:

$$H(S) = \Phi_{out}/\Phi_{in} = \{2*\zeta*\omega_n*S+\omega_n^2\}/\{S^2+2*\zeta*\omega_n*S+\omega_n^2\}$$

$$= \{(K/S)*F(s)\}/\{1+(K/S)*F(s)\}$$

where $\zeta$ is the damping factor of the loop and $\omega_n$ is the natural frequency of the loop.

From this expression, the filter's gain coefficients $\alpha$ and $\beta$, which determine how rapidly the DPLL will track changes in the phase detector's error signal, can be derived as:

$\alpha=\omega_n^2/K$, and $\beta=2*\zeta*\omega_n/K$.

From these expressions for $\alpha$ and $\beta$ and a VCO gain K=1, expressions may be obtained for the DPLL's frequency and phase accumulators as: $\alpha_d=T_2*2*\zeta*\omega_n$, and $\beta_d=T_1T_2\omega_n^2$. Parameter settings for the DPLL depend upon respective operational modes: ACQUIRE, TRACK, FREEZE and FREE-RUN.

Incoming ATM AAL2 cells arrive at a prescribed periodic rate plus a cell delay variation, which is dynamic and unknown. Each newly arriving cell is written by the control processor into the cell jitter buffer at the address pointed to by the write pointer. The control processor then advances the write pointer and toggles the cell arrival interrupt signal, which is coupled to the phase detector of the DPLL. The control processor also reads out a cell byte from the address of the cell jitter buffer pointed to by the read pointer for each 8 KHz clock cycle. The cell jitter buffer read pointer is then advanced to the next cell byte stored in the buffer.

At the start of operation, the system is placed in 'FREE-RUN' mode, with system parameters set to FREE-RUN mode values. Incoming ATM cells are monitored for the start of a new voice/voice-band data call. When a new AAL2 cell is received, a determination is made as to whether the PLL is already locked. If so, the PLL transitions to 'TRACK' mode.

In TRACK mode, the loop filter's gain coefficients $\alpha_d$ and $\beta_d$ are gradually reduced from their initial values to TRACK mode values, and the CODEC's clock input is switched from the free-running clock to the PLL's tracking clock. When the call is terminated, the routine transitions to FREEZE mode, wherein it stores the current value of frequency offset, so as to reduce the time required for the DPLL to acquire lock for the next incoming call. Otherwise the routine stays in TRACK mode.

If the PLL is not locked, the DPLL transitions to ACQUIRE mode. In this mode, the CODEC clock will have a large amount of jitter, due to high gain loop filter coefficients. To maintain high modem performance during data calls, a free-running clock is supplied to the CODEC. Once the DPLL is locked, the routine transitions to TRACK mode and proceeds as described above.

DETAILED DESCRIPTION

Figure 1:
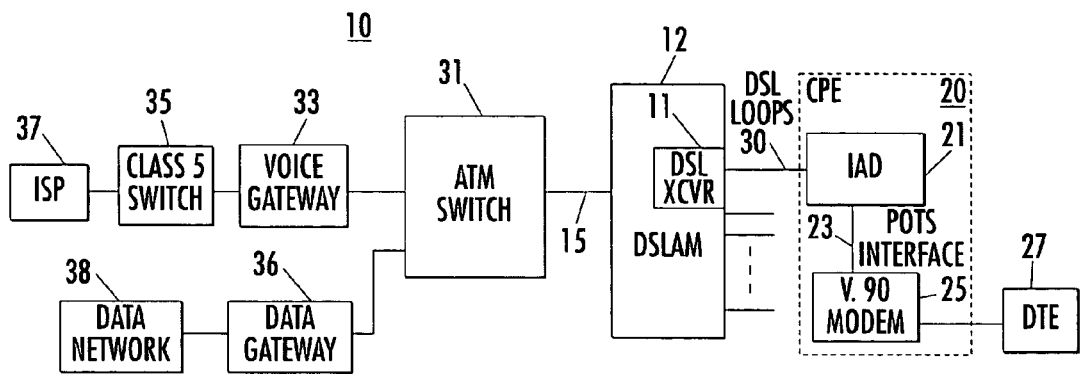
FIG. 1 diagrammatically illustrates the general architecture of an xDSL network employing 'cell'-based asynchronous transfer mode protocol for transporting voice and voice-band data.

Before detailing the DPLL-based adaptive clock recovery scheme of the present invention, it should be observed that the present invention resides primarily in a prescribed set of conventional telecommunication signaling subsystems and components and attendant supervisory communications microprocessor circuitry, that controls the operations of such components. In a practical implementation that facilitates their incorporation into existing communication equipment, these arrangements may be readily configured as a field programmable gate array (FPGA)-implementation, application specific integrated circuit (ASIC) chip sets, programmable digital signal processors, or general purpose processors.

Consequently, the configuration of such components and the manner in which they are interfaced with other communication equipment of a telephone network have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to show the major components of the system in a convenient functional grouping, whereby the present is invention may be more readily understood.

Figure 2:
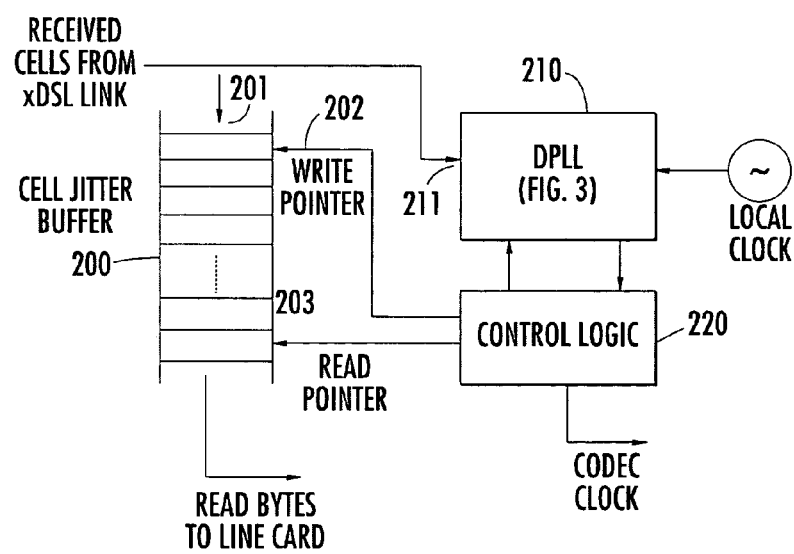
FIG. 2 diagrammatically illustrates the architecture of a digital phase locked loop (DPLL)-based, adaptive clock recovery scheme according to the present invention.

FIG. 2 diagrammatically illustrates the architecture of a digital phase locked loop (DPLL)-based, adaptive clock recovery scheme according to the present invention. As shown therein, a cell jitter buffer 200 and a second order digital PLL 210 (shown in detail in FIG. 3 to be described) have respective input ports 201 and 211 thereof coupled to receive signals associated with ATM (AAL2) cells as captured by the ATM cell receiver's communications control processor from the xDSL link.

The cell jitter buffer 200 is preferably configured as a first-in, first-out (FIFO) buffer of length L cells, where L is greater than or equal to the maximum expected CDV. As a non-limiting example, the cell jitter buffer may have a length of eight ATM cells. Cell jitter buffer 200 receives and stores the actual ATM cells, while the digital PLL 210 is coupled to receive a cell arrival interrupt signal generated by the control processor as a respective cell is captured from the link. The interrupt can be generated by scanning an AAL2 cell header via software or hardware to detect a match in the channel of interest. The PLL 210 is also coupled to receive a local high frequency service clock signal $f_s$ (e.g., 40.96 MHz, for the parameters of the present example), which is used to set the phase adjustment step of the PLL, as will be described.

As a cell is received, it is controllably written into that storage location of the cell jitter buffer 200 pointed to by a 'write' pointer 202 as generated by a control logic circuit 220. In addition, the control logic circuit 220 is also coupled to generate a 'read' pointer 203 to define from which location in the cell jitter buffer 200 the next cell is to be extracted for delivery to the line card, as well as a CODEC clock.

Figure 3:
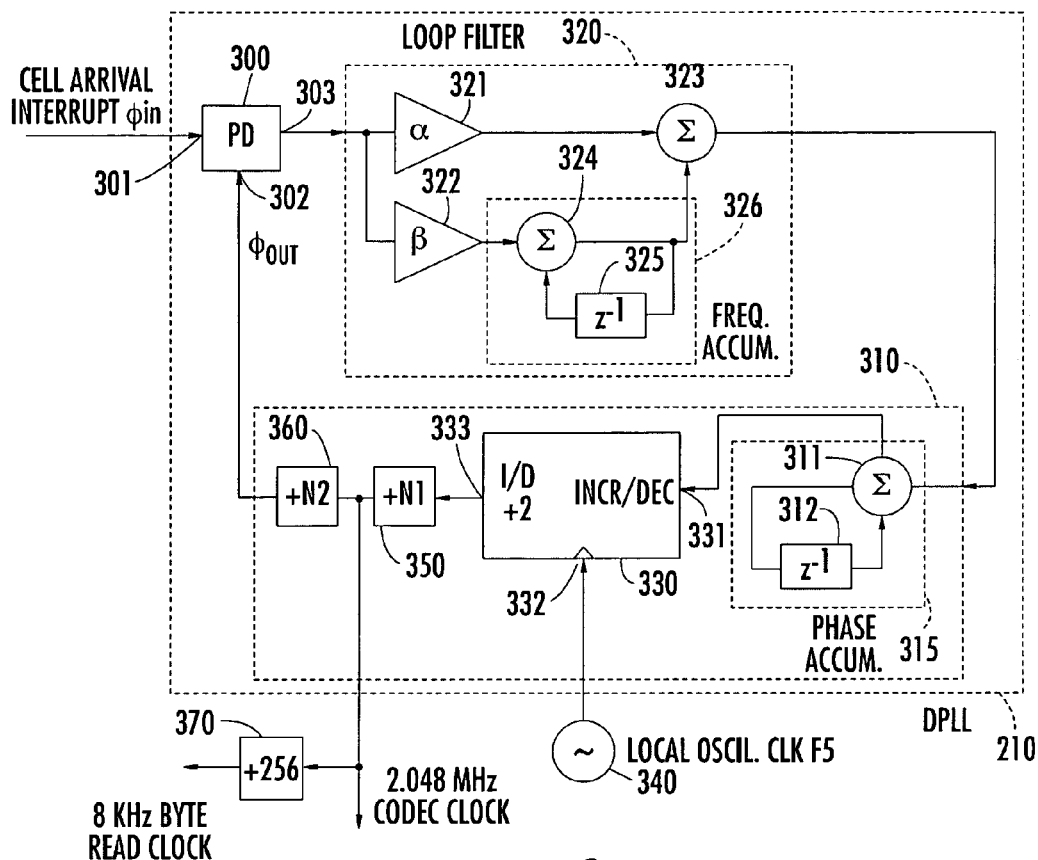
FIG. 3 is a functional block diagram of the DPLL employed in the adaptive clock recovery scheme of FIG. 2.

A functional block diagram of the DPLL 210 is shown in FIG. 3 as comprising a phase detector 300 having a first input 301 coupled to receive a cell arrival signal $\Phi_{in}$ and a second input 302 coupled to the output of a voltage controlled oscillator (VCO) block, which is implemented as a controlled clock generator 310, from which a recovered output clock signal $\Phi_{out}$ may be derived. The phase detector 300 has its output 303 coupled to a (second order) loop filter 320, which drives the clock generator 310. The phase detector 300 should have at least the same dynamic range as the cell jitter buffer. In the present example, for a cell jitter buffer length of eight cells, a 384 Kbps transfer rate yields a buffer length on the order of eight milliseconds.

In accordance with the invention, the phase detector (PD) 300 functions as an edge detector, being operative to count the number of clock cycles of a reference (service) frequency $f_s$ (e.g., 40.96 MHz) that occur between prescribed transitions of the input signal $\Phi_{in}$ and the DPLL's output clock signal $\Phi_{out}$. For example, as shown in the signal timing diagram of FIG. 4, the phase detector 300 counts the number of service frequency clock cycles that occur between a rising edge 401 of the input signal $\Phi_{in}$ and an associated rising edge 411 the PLL output clock signal $\Phi_{out}$, and outputs a count-representative phase error signal $P_e$, of a prescribed digital code resolution to loop filter 320. For the parameters of the present example, the nominal period of the PLL's output clock signal $\Phi_{out}$ is on the order of eleven milliseconds, so that phase detector 300 will generate a phase error signal $P_e$ every 11 ms. (In the event of a dropped cell, the phase detector 300 is prevented from rolling over.)

The second order loop filter 320 includes a first gain stage 321 having a first loop filter gain coefficient ad and a second gain stage 322 having a second loop filter gain coefficient $\beta_d$. The output of filter gain stage 321 is coupled to one input of a summation operator 323, whose output is the output of the loop filter. The output of the second gain stage 322 is coupled to one input of a frequency accumulator 326 formed of 324, the output of which is coupled to a second input of summation operator 323 and also over a delay feedback path containing a one stage delay 325 to a second input of summation operator 324.

The output of the loop filter 320 is coupled to one input of a summation operator 311 of a phase accumulator 315 within the clock generator 310. The output of the summation operator 311 is coupled to over a delay feedback path containing a one stage delay 312 to a second input of the summation operator 311, and to an increment/decrement control input 331 of a service frequency increment/decrement unit 330. Increment/decrement unit 330 has a clock input 332 coupled to the output of a service frequency clock generator (local oscillator) 340, and contains a divide-by-two output 333 coupled to a divide-by-$N_1$ frequency divider 350. Implementing the VCO function as an increment/decrement of a high frequency service clock frequency has the advantage of not constraining/reducing the operation of (e.g., causing a training down or a dropping of the loop by) a high performance modem (such as a V.90 modem), and does not require the use of additional hardware (beyond arrangements, such as an FPGA and the like, referenced above).

In the present example, $N_1$=10. As a result, for a reference service frequency $f_s$=40.96 MHz, the output of divide-by-$N_1$ frequency divider 750 is operative to produce a frequency of 40.96/(20) MHz=2.048 MHz (which corresponds to the frequency of the CODEC clock). The output of divide-by-$N_1$ frequency divider 350 is further coupled to a divide-by-$N_2$ frequency divider 360 and to a divide-by-$N_3$ frequency divider 370. In the present example, $N_2$=22528 and $N_3$=256. As a result, the output of frequency divider 360, which corresponds to the DPLL output clock signal $\Phi_{out}$, is 2.048/22528 MHz=90.9090 Hz., the period of which is the eleven millisecond interval, as shown in the clock signal timing diagram of FIG. 4. The output of the frequency divider 370 is 2048/256 KHz=8 KHz—the frequency of the byte read clock.

With both the phase detector 300 and the loop filter 320 running at 90.9090 Hz, a reasonably fast acquisition speed may be realized by running both the phase accumulator 315 and the clock generator 330 at 128 KHz, as a non-limiting example. The period or time step $T_1$ for the loop filter integrator is therefore $T_1$=1/90.9090 seconds, while the time step $T_2$ for the (VCO) clock generator's integrator is $T_2$=1/128000 seconds.

In general, second order loop filter function F(S) may be expressed in equation (1) as:

$$F(S) = \alpha + \beta/S \quad (1)$$

The system transfer function H(S) for $\Phi_{out}/\Phi_{in}$ may be written in equation (2) as:

$$H(S) = \Phi_{out}/\Phi_{in} = \{(K/S) * F(s)\}/\{1 + (K/S) * F(s)\} \quad (2)$$
$$= \{(K*\alpha*S) + (K*\beta)\}/\{(S^2 + K*\alpha*S) + (K*\beta)\}$$

where K is VCO gain, and $\alpha$ and $\beta$ are filter constants.

Equating equation (2) with the standard expression for a second order control system yields the following:

$$H(S) = \Phi_{out}/\Phi_{in} \quad (3)$$
$$= \{2*\zeta*\omega_n*S + \omega_n^2\}/\{S^2 + 2*\zeta*\omega_n*S + \omega_n^2\}$$
$$= \{(K/S)*F(s)\}/\{1 + (K/S)*F(s)\}$$

where $\zeta$ is the damping factor of the loop and $\omega_n$ is the natural frequency of the loop.

From equation (3), the following expressions for the filter parameters $\alpha$ and $\beta$ can be derived:

$$\alpha = \omega_n^2/K \quad (4)$$

$$\beta = 2*\zeta*\omega_n/K \quad (5)$$

Figures 5, 6, 8:
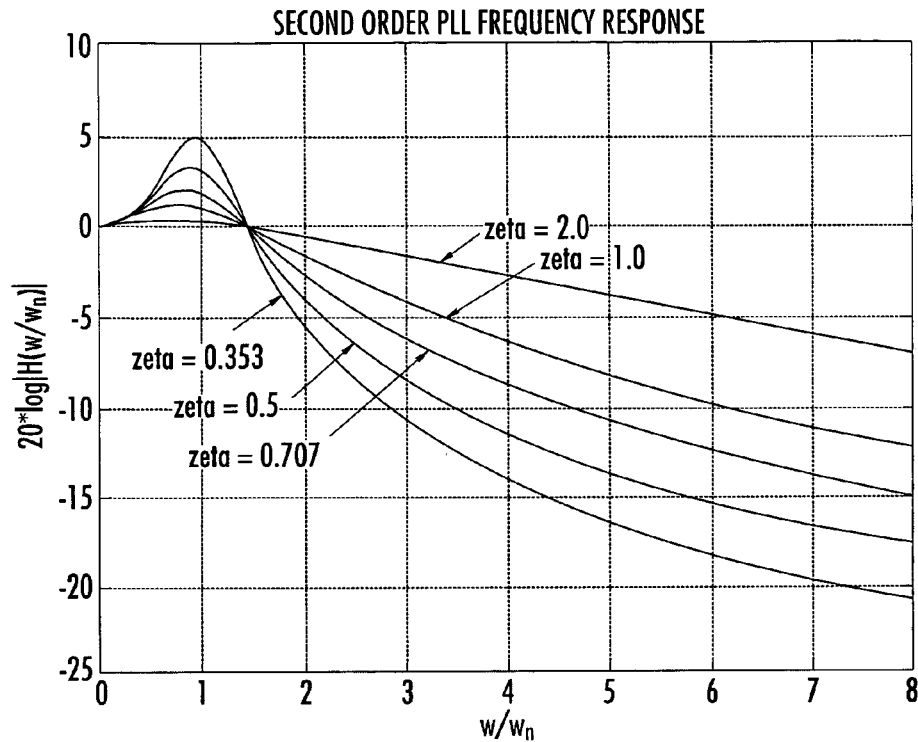
FIG. 5 graphically illustrates a closed loop PLL response for different values of $\zeta$.
FIG. 6 contains a Table showing parameter settings for various operational modes of the DPLL of FIG. 3.
FIG. 8 contains a Table listing changes to values of loop filter gain coefficients with changes in operational modes of the DPLL of FIG. 3.

For a critically damped system response $\zeta = 2^{1/2}/2 = 0.707$.
For an over-damped system response $0.707 < \zeta < 2$.
For an under-damped system response $0 < \zeta < 0.707$.
FIG. 5 graphically illustrates a closed loop PLL response for different values of $\zeta$.

The natural frequency parameter $\omega_n$ may be defined as:

$$\omega_n = \{2*B_L\}/\{\zeta + (\frac{1}{4}\zeta)\}, \quad (6)$$

where $B_L$ is the noise bandwidth of the loop.

Thus, filter parameters $\alpha$ and $\beta$ determine how rapidly the PLL will track changes in the phase detector's error signal. At the start of a call, $\alpha$ and $\beta$ are such that the system will acquire the source clock frequency fast enough to prevent the jitter buffer from overflowing or underflowing. However, once the transmitter clock has been acquired, $\alpha$ and $\beta$ are (iteratively or stepwise) adjusted, so that the system will track slight changes in the source frequency and reject CDV noise.

Using the above expressions (4) and (5) for $\alpha$ and $\beta$ and a VCO gain K=1, expressions are obtained for the DPLL's frequency and phase accumulators as:

$$\alpha_d = T_2 * 2 * \zeta * \omega_n, \text{ and} \quad (7)$$

$$\beta_d = T_1 T_2 \omega_n^2 \quad (8)$$

For a critically damped loop ($\zeta$=0.707), $\omega_n = B_L/0.53$; for $B_L$=1 Hz, $\omega_n$=1.88 rad/sec.
$\beta_d = 2.04 \times 10^{-7}$, which is approximately equal to $2^{-21}$;
$\alpha_d = 2.1 \times 10^{-5}$ or approximately $2^{-15}$.

FIG. 6 contains a Table showing parameter settings for various operational modes of the DPLL of FIG. 3 as: ACQUIRE, TRACK, FREEZE and FREE-RUN.

Figure 7:
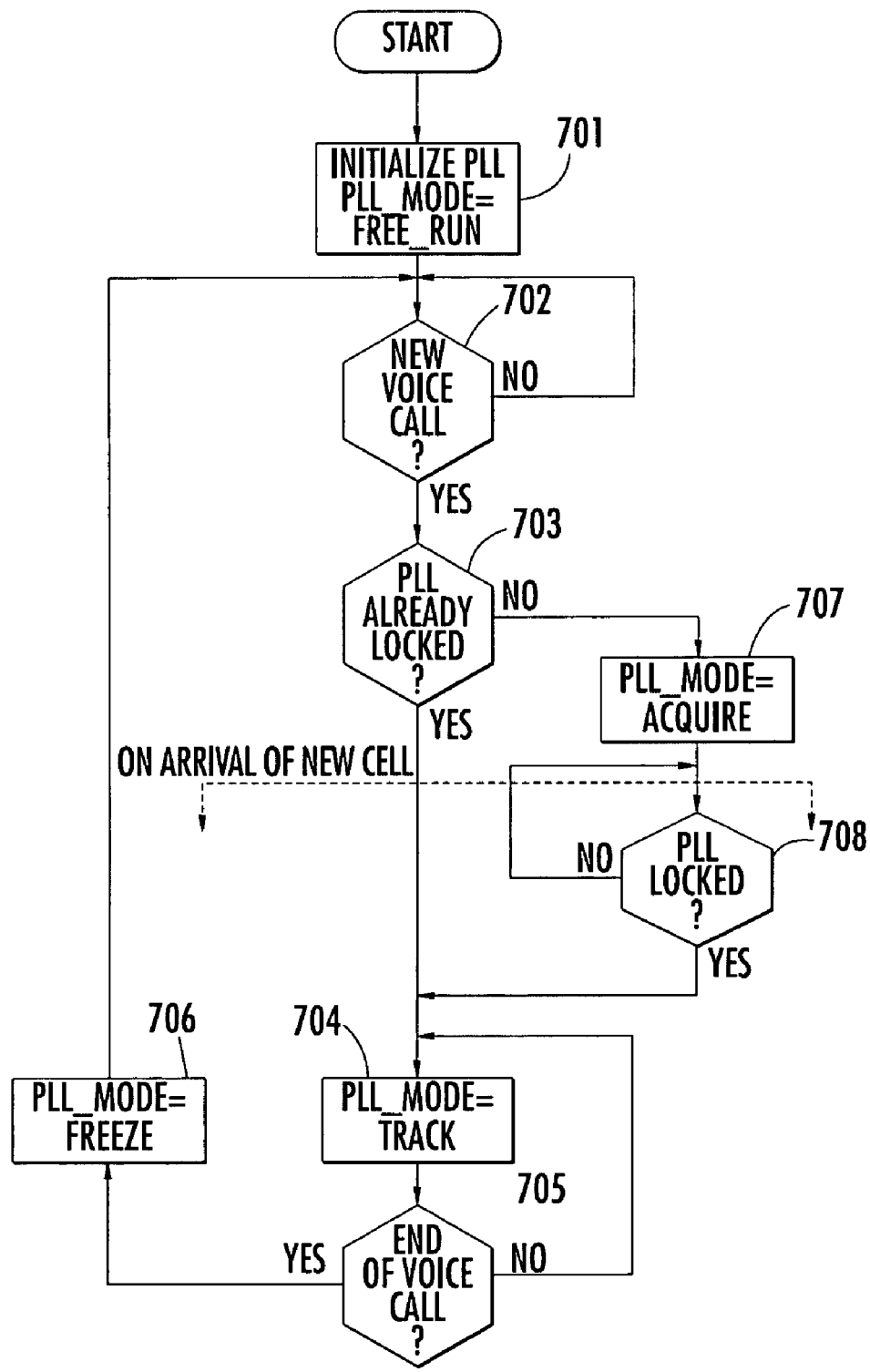
FIG. 7 is a flow chart of associated with the operation of the digital phase locked loop of FIG. 3.

The operation of the digital phase locked loop of FIG. 3 may be understood by reference to the flow chart of FIG. 7, steps of which are detailed below. ATM AAL2 cells arrive at a prescribed periodic rate (e.g., every 5.5 ms for the parameters of the present example) plus some cell delay variation, which is dynamic and unknown. With each new arriving cell, the control processor writes the cell into the cell jitter buffer at the address pointed to by the write pointer, advances the write pointer and toggles the cell arrival interrupt signal (shown in FIG. 4), which is coupled to the phase detector 320 of the DPLL 300 of FIG. 3. In addition, the control processor reads out a cell byte from the address of the cell jitter buffer pointed to by the read pointer 203 for each 8 KHz clock cycle. The cell jitter buffer read pointer is then advanced to point to the next cell byte stored in the buffer.

At step 701, system parameters are initialized to those shown in the Table of FIG. 6 associated with FREE-RUN mode. In query step 702, ATM cells are monitored for the start of a new voice/voice-band data call. When a new AAL2 cell is received (the answer to query step 702 is YES), the routine transitions to query step 703 to determine whether the PLL is already locked. Where the answer to 'PLL already locked?' query step 703 is YES), the PLL is switched to TRACK mode in step 704.

Figure 4:
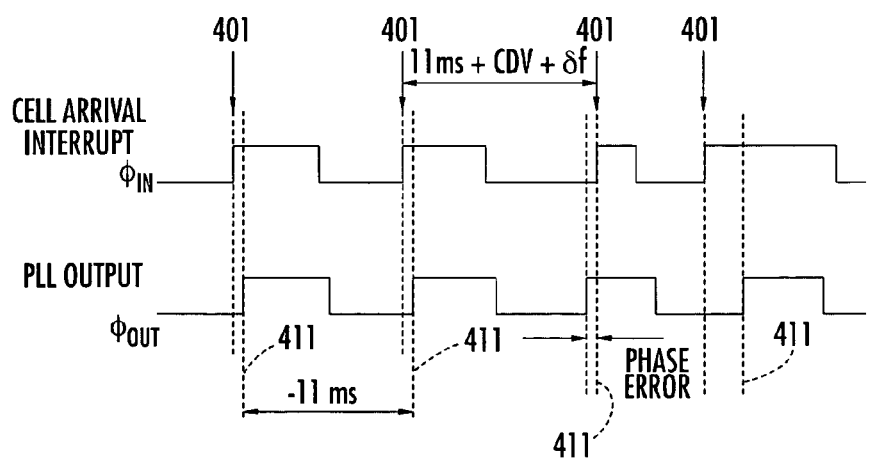
FIG. 4 is a signal timing diagram of FIG. 3 associated with the operation of the adaptive clock recovery scheme of FIG. 2.

In TRACK mode, the loop filter's gain coefficients $\alpha_d$ and $\beta_d$ are gradually reduced from their initial values to TRACK mode values (see the Table of FIG. 8), and the CODEC's clock input is switched from the free-running 2.048 MHz clock to the PLL's 2.048 MHz tracking clock produced at the output of divide-by-$N_1$ frequency divider 350 shown in the timing diagram of FIG. 4. Once the call is terminated (the answer to End of voice call? query step 705 is YES), the routine transitions to FREEZE mode step 706, which stores the current value of frequency offset, so as to reduce the time required for the DPLL to acquire lock for the next incoming call. Otherwise the routine loops to step 704.

Where the answer to 'PLL already locked?' query step 703 is NO (indicating that the PLL is not locked), the DPLL is switched to ACQUIRE mode in step 707. During ACQUIRE mode, the 2.048 MHz CODEC clock will have a large amount of jitter, due to the use of high gain loop filter coefficients, shown in the Tables of FIGS. 6 and 8. In order to maintain modem performance high during data calls, a free-running 2.048 MHz clock is supplied to the CODEC. Once the DPLL is locked (the answer to query step is YES), the routine transitions to TRACK mode in step 704 and proceeds as described supra.

As will be appreciated from the above description, being a totally digital implementation, the adaptive clock recovery scheme of the present invention is readily incorporated into the communication signal processor of the receiving entity for constant bit-rate (CBR) telecommunication signals transmitted over an asynchronous transfer mode (ATM) or ATM-like network. The digital phase locked loop (DPLL) produces a recovered clock based upon a phase detector's count of high frequency service clock cycles between transitions in an input signal representative of instances of receipt of ATM cells and a reference clock signal. This, in combination with a second order loop filter and digitally implementing the VCO function as an increment/decrement of a high frequency service clock frequency have the advantage of not impairing the operation of a high performance modem (such as a V.90 modem), and requiring no additional hardware.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of providing a clock recovery function in the receiving entity of constant bit-rate (CBR) communication signals transported over an asynchronous transfer mode (ATM) or ATM-like network, in order to provide reliable voice and voice-band data communications in a manner that is effectively transparent to an associated modem serving customer premises equipment, said method comprising the steps of:

(a) writing ATM cells received over said network in a cell buffer and reading out previously stored cells from said cell buffer for delivery to a communication circuit;

(b) generating an input clock signal having transitions associated with times of receipt of ATM cells from said network;

(c) generating a reference clock signal based upon a relatively high frequency service clock signal from which an output clock signal, having a frequency corresponding to a source clock frequency for transmitting said ATM cells over said network, may be derived; and (d) coupling said input clock signal and said reference clock signal to a phase detector of a phase locked loop (PLL), the output of which is used to control a clock signal generator to which said service clock signal is applied, and causing said PLL to generate said output clock signal in accordance with the number of cycles of said service clock signal that occur between respective transitions in said input clock signal and said reference clock signal.

2. The method according to claim 1, wherein step (a) comprises reading out said stored cells from said cell buffer using a read clock signal derived from the output clock signal generated in step (d).

3. The method according to claim 1, wherein said phase detector is coupled through a loop filter and phase accumulator to said clock signal, and wherein said phase detector comprises a counter that is operative to count the number of clock cycles of said service clock signal that occur between respective like transitions in said input clock signal and said reference clock signal, and wherein said output clock signal is defined in accordance with a prescribed multiple of said reference clock signal.

4. The method according to claim 3, wherein step (d) comprises adjusting values of one or more gain coefficients of said loop filter in accordance with progress of an incoming call over said network.

5. The method according to claim 4, wherein step (d) comprises setting the bandwidth of said loop filter at a relatively high bandwidth for acquisition mode of operation of said receiving entity, and then reducing the bandwidth of said loop filter to a relatively low bandwidth for tracking mode of operation of said receiving entity.

6. The method according to claim 4, wherein said clock signal generator is operative to generate a base clock signal is derived from said service clock signal, and controllably modified in accordance with the output of said phase detector to produce said output clock signal.

7. The method according to claim 6, wherein said clock signal generator is operative to controllably increment or decrement the frequency of said service clock signal in accordance with the output of said phase detector.

8. The method according to claim 7, wherein said clock signal generator is operative to controllably divide the frequency of said base clock signal by a prescribed divisor value to produce said output clock signal.

9. The method according to claim 8, wherein step (c) comprises dividing the frequency of said output clock signal by a further divisor to generate said reference clock signal.

10. The method according to claim 1, wherein step (b) comprises generating said input clock signal in accordance with a cell arrival interrupt signal supplied by a control processor as a respective ATM cell is received from said network.

11. The method according to claim 1, wherein step (d) comprises (d1) in response to the start of a new voice/voice-band data call, determining whether said PLL is already locked, (d2) in response to step (d1) indicating that said PLL is already locked, setting parameters of said PLL to values associated with a tracking mode of operation of said PLL, but otherwise setting parameters of said PLL to values associated with an acquisition mode of operation, until said PLL is locked, and then changing parameters of said PLL to values associated with said tracking mode of operation, and (d3) in response to termination of said call, storing a current operational parameter of said PLL, so as to reduce the time required for the PLL to acquire lock for the next incoming call.

12. A clock recovery apparatus for providing a clock recovery function in the receiving entity of a communication system to implement adaptation of constant bit-rate (CBR) services over an asynchronous transfer mode (ATM) or ATM-like network comprising:

a cell buffer into which ATM cells received over said network are controllably stored and read out for delivery to a destination communication circuit;

an ATM cell receiver, which is operative to generate an input clock signal in accordance with times of receipt of ATM cells from said network, transitions in said input clock signal depending upon cell delay variations through said network;

a reference clock signal generator which is operative to generate a reference clock signal based upon a relatively high frequency service clock signal from which an output clock signal, having a frequency corresponding to a source clock frequency for transmitting said ATM cells over said network, may be derived; and a phase locked loop (PLL) having a phase detector having respective inputs coupled to receive said input clock signal and said reference clock signal, and having an output coupled to control said clock signal generator, so that said PLL generates said output clock signal in accordance with the number of cycles of said service clock signal that occur between respective transitions in said input clock signal and said reference clock signal.

13. The clock recovery apparatus according to claim 12, wherein cells stored in said cell buffer are read out in accordance with a read clock signal derived from said output clock signal.

14. The clock recovery apparatus according to claim 12, wherein said phase detector is coupled through a loop filter and phase accumulator to said clock signal generator, and wherein said phase detector comprises a counter that is operative to count the number of clock cycles of said service clock signal that occur between respective like transitions in said input clock signal and said reference clock signal, and wherein said output clock signal is defined in accordance with a prescribed multiple of said reference clock signal.

15. The clock recovery apparatus according to claim 13, wherein values of one or more gain coefficients of a second order loop filter vary in accordance with progress of an incoming call over said network.

16. The clock recovery apparatus according to claim 15, wherein values of said one or more gain coefficients of said second order loop filter vary in accordance with the incoming call over said network.

17. The clock recovery apparatus according to claim 15, wherein values of both said gain coefficients are adjusted such that the second order loop filter response is critically damped.

18. The clock recovery apparatus according to claim 15, wherein values of said one or more gain coefficients of said second order loop filter are varied to increase the bandwidth of said second order loop filter for acquisition mode of operation of said receiving entity, and to decrease the bandwidth of said second order loop filter for tracking mode of operation of said receiving entity.

19. The clock recovery apparatus according to claim 12, wherein said reference clock signal generator is operative to controllably increment or decrement the frequency of said service clock signal in accordance with the output of said phase detector.

20. The clock recovery apparatus according to claim 14, wherein said clock signal generator is operative to generate a base clock signal, that is derived from said service clock signal and is controllably modified in accordance with the output of said phase detector to produce said output clock signal.

21. The clock recovery apparatus according to claim 20, wherein said clock signal generator includes a first divider that is operative to divide the frequency of said base clock signal, as controllably modified in accordance with the output of said phase detector, by a prescribed divisor value to produce said output clock signal.

22. The clock recovery apparatus according to claim 21, wherein said clock signal generator includes a second divider that is operative to divide the frequency of said output clock signal by a further divisor to generate said reference clock signal.

23. The clock recovery apparatus according to claim 12, wherein, in response to said PLL being locked at the start of a new voice/voice-band data call, parameters of said PLL are set at values associated with a tracking mode of operation of said PLL, but are otherwise set at values associated with an acquisition mode of operation until said PLL is locked, and then changed to values associated with said tracking mode of operation and, in response to termination of said call, an operational parameter of said PLL is stored, in order to reduce time required for the PLL to acquire lock for a new call.

24. A method of controlling the operation of a phase locked loop (PLL) used to provide a clock recovery function in the receiving entity of constant bit-rate (CBR) communication signals transported over an asynchronous transfer mode (ATM) or ATM-like network, in order to provide reliable voice and voice-band data communications in a manner that is effectively transparent to an associated modem serving customer premises equipment, said method comprising the steps of:

(a) in response to the start of a new voice/voice-band data call, determining whether said PLL is already locked;

(b) in response to step (a) indicating that said PLL is already locked, setting parameters of said PLL to values associated with a tracking mode of operation of said PLL, but otherwise setting parameters of said PLL to values associated with an acquisition mode of operation, until said PLL is locked, and thereafter changing parameters of said PLL to values associated with said tracking mode of operation; and (c) in response to termination of said call, storing a current operational parameter of said PLL, so as to reduce the time required for the PLL to acquire lock for the next incoming call.

* * * * *